(12) United States Patent
Dillard et al.

(10) Patent No.: US 12,182,784 B2
(45) Date of Patent: *Dec. 31, 2024

(54) AUTOMATED TRANSFER OF ENRICHED TRANSACTION ACCOUNT DATA TO A SUBMITTED RECORD OF CHARGE

(71) Applicant: American Express Travel Related Services Company, Inc., New York, NY (US)

(72) Inventors: David Alan Dillard, Glendale, AZ (US); Ravikanth Erramilli, Phoenix, AZ (US); David Ibrahim, Brooklyn, NY (US); Barbara Lynn Shcolnik-Bateman, Paradise Valley, AZ (US); Sashidhar Karkada Srinivasa, Glendale, AZ (US)

(73) Assignee: American Express Travel Related Services Company, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/187,289

(22) Filed: Mar. 21, 2023

(65) Prior Publication Data

US 2023/0222464 A1 Jul. 13, 2023

Related U.S. Application Data

(63) Continuation of application No. 16/732,860, filed on Jan. 2, 2020, now Pat. No. 11,631,069, which is a continuation of application No. 14/621,152, filed on Feb. 12, 2015, now Pat. No. 10,535,050.

(51) Int. Cl.
*G06Q 20/00* (2012.01)
*G06Q 20/04* (2012.01)
*G06Q 20/08* (2012.01)
*G06Q 20/12* (2012.01)
*G06Q 30/04* (2012.01)

(52) U.S. Cl.
CPC .......... *G06Q 20/12* (2013.01); *G06Q 20/047* (2020.05); *G06Q 20/085* (2013.01); *G06Q 30/04* (2013.01)

(58) Field of Classification Search
CPC .... G06Q 20/12; G06Q 20/047; G06Q 20/085; G06Q 30/04
USPC ......................................................... 705/44
See application file for complete search history.

(56) References Cited

U.S. PATENT DOCUMENTS

| | | |
|---|---|---|
| 9,811,810 B1 | 11/2017 | Ranganath et al. |
| 2003/0126094 A1 | 7/2003 | Fisher et al. |
| 2006/0169767 A1* | 8/2006 | Moulton .............. G06Q 20/355 235/380 |
| 2011/0131135 A1 | 6/2011 | Carlson et al. |
| 2011/0276441 A1* | 11/2011 | Bond ..................... G06Q 40/02 705/30 |

(Continued)

*Primary Examiner* — Hai Tran

(57) ABSTRACT

Transaction account holders are able to attach additional data to a transaction in concert with the transaction being initiated, prior to the merchant posting the transaction. Transaction account holders do not have to wait and/or opt for an external service provider to assist with the compiling and/or attaching of data at a later point in time (e.g., after the merchant posts the transaction). Transaction account holders may upload and access electronic receipts associated with a transaction authorization almost immediately after the sale and/or authorization of the transaction.

17 Claims, 3 Drawing Sheets

(56) References Cited

U.S. PATENT DOCUMENTS

| | | | |
|---|---|---|---|
| 2012/0130897 A1* | 5/2012 | Chisholm | G06Q 20/04 |
| | | | 705/44 |
| 2012/0239477 A1 | 9/2012 | Cueli et al. | |
| 2012/0284188 A1* | 11/2012 | Vasquez | G07F 19/20 |
| | | | 705/44 |
| 2013/0268315 A1 | 10/2013 | Cotton et al. | |
| 2014/0040135 A1 | 2/2014 | Ovick et al. | |
| 2014/0108210 A1* | 4/2014 | Chelst | G06Q 20/047 |
| | | | 705/30 |
| 2015/0032616 A1 | 1/2015 | Blackhurst et al. | |
| 2015/0032638 A1 | 1/2015 | Dintenfass et al. | |
| 2015/0142592 A1 | 5/2015 | Chauhan | |
| 2015/0287077 A1 | 10/2015 | Celikyilmaz et al. | |
| 2016/0132875 A1 | 5/2016 | Blanco et al. | |
| 2016/0171611 A1 | 6/2016 | Sheng et al. | |
| 2017/0262784 A1 | 9/2017 | Lowery et al. | |

* cited by examiner

AUTOMATED TRANSFER OF ENRICHED TRANSACTION ACCOUNT DATA TO A SUBMITTED RECORD OF CHARGE

CROSS-REFERENCE TO RELATED APPLICATION

This application is a continuation of U.S. patent application Ser. No. 16/732,860, entitled "AUTOMATED TRANSFER OF ENRICHED TRANSACTION ACCOUNT DATA TO A SUBMITTED RECORD OF CHARGE" and filed on Jan. 2, 2020, which is a continuation of U.S. Patent Application Ser. No. 14/621,152, entitled "AUTOMATED TRANSFER OF ENRICHED TRANSACTION ACCOUNT DATA TO A SUBMITTED RECORD OF CHARGE" and filed on Feb. 12, 2015, which are incorporated by reference as if set forth herein in their entireties.

FIELD

The present disclosure generally relates to financial transactions, and more particularly, a system and method of appending enhanced information to a financial transaction record.

BACKGROUND

Credit cards, charge cards, and other transaction instruments are commonly accepted today as a form of payment under a variety of circumstances. A transaction instrument may be used to complete a purchase in-person (e.g., at a retail store, a restaurant, or a hotel) by physically presenting a merchant with the transaction instrument. A transaction instrument may also be used to complete a purchase, without physically presenting the transaction instrument, by relaying information associated with the transaction instrument (e.g., account number, account name, expiration date, and billing address) to a merchant, such as though a computer or point of sale (POS) device. Examples of merchants that accept transaction account information as payment, without physically receiving the transaction instrument include Internet, telephone and mail order merchants.

SUMMARY

A method includes authorizing, by a computer-based system configured for processing transactions, a transaction between a merchant and a transaction account holder. According to various embodiments, the method may include transmitting, by the computer-based system, a notification to at least one of the merchant or the transaction account holder that a transaction has been initiated and a pending charge has been created. The method may include receiving, by the computer-based system, enriched data from at least one of the merchant or a transaction account bolder to be associated with the pending charge. A pending charge occurs prior to a charge being posted by the merchant. The method may include associating, by the computer-based system, the enriched data to the pending charge. The method may include storing, by the computer-based system, the enriched data to an enriched data database.

According to various embodiments, the method may include receiving, by the computer-based system, a posted charge associated with the transaction from the merchant; reconciling, by the computer-based system, the pending charge and the posted charge; and transferring the enriched data from being associated with the pending charge to being associated with the posted charge. The method may include transmitting the enriched data to at least one of the merchant, the transaction account holder or a third party, in response to a request to view the enriched data. In response to the receipt of the notification, enrichment data may be associated with the pending charge. The pending charge may be configured to be associated with enrichment data substantially simultaneously with an initiation of the transaction. In response to enriched data being associated with a pending charge that does not mature into a posted charge, the enriched data may be detached from the pending charge after a predetermined period and the transaction account holder may access the enriched data by viewing an unmatched data file.

BRIEF DESCRIPTION OF THE DRAWINGS

The features and advantages of the present disclosure will become more apparent from the detailed description set forth below when taken in conjunction with the drawings. The left-most digit of a reference number identifies the drawing in which the reference number first appears.

DETAILED DESCRIPTION

Figure 1:
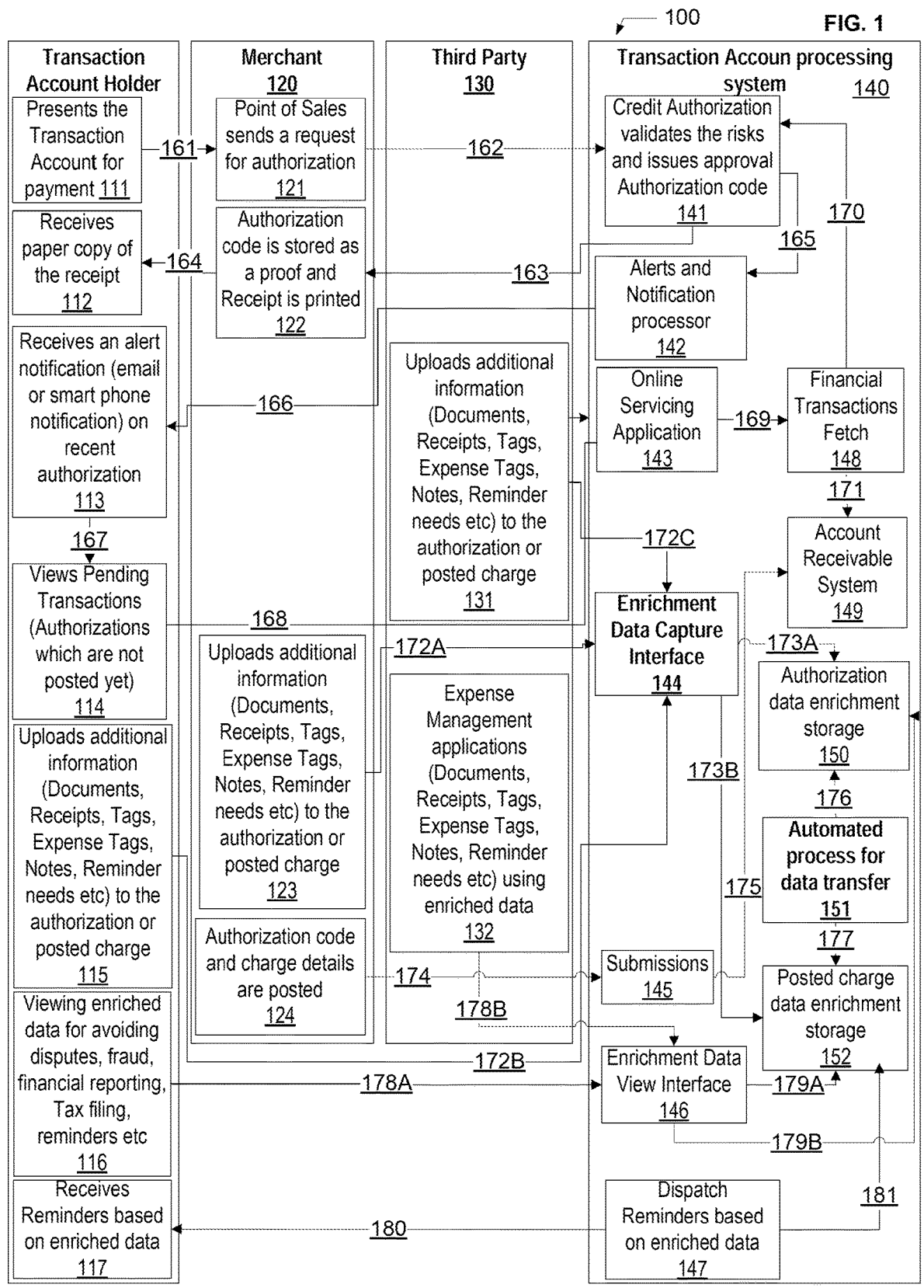
FIG. 1 illustrates a process flow for attaching enriched data to a pending transaction, in accordance with various embodiments.

The detailed description of exemplary embodiments herein makes reference to the accompanying drawings, which show the exemplary embodiments by way of illustration and their best mode. While these exemplary embodiments are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not of limitation. For example, the steps recited in any of the method or process descriptions may be executed in any order and are not limited to the order presented. Moreover, any of the functions or steps may be outsourced to or performed by one or more third parties. Furthermore, any reference to singular includes plural embodiments, and any reference to more than one component may include a singular embodiment.

Phrases and terms similar to "financial institution," "transaction account issuer" and "payment processor" may include any person, entity, software and/or hardware that offers transaction account services. Although often referred to as a "financial institution," the financial institution may represent any type of bank, lender or other type of account issuing institution, such as credit card companies, card sponsoring companies, or third party issuers under contract with financial institutions. It is further noted that other participants may be involved in some phases of the transaction, such as an intermediary settlement institution.

The terms "payment vehicle," "financial transaction instrument," "transaction instrument," or "transaction account product" may be used interchangeably throughout to refer to a financial instrument. As used herein, an account code may or may not be associated with a physical financial instrument.

Phrases and terms similar to a "buyer," "participant", "consumer," and "user" may include any person, entity, software and/or hardware that receives items in exchange for consideration (e.g. financial payment). For example, a buyer may purchase, lease, rent, barter or otherwise obtain items from a supplier and pay the supplier using a transaction account.

Phrases or terms similar to a "processor" (such as a payment processor) or "transaction account issuer" may include a company (e.g., a third party) appointed (e.g., by a merchant) to handle transactions for merchant banks. Processors may be broken down into two types: front-end and back-end. Front-end processors have connections to various transaction accounts and supply authorization and settlement services to the merchant banks' merchants. Back-end processors accept settlements from front-end processors and, via The Federal Reserve Bank, move money from an issuing bank to the merchant bank. In an operation that will usually take a few seconds, the payment processor will both check the details received by forwarding the details to the respective account's issuing bank or card association for verification, and may carry out a series of anti-fraud measures against the transaction. Additional parameters, including the account's country of issue and its previous payment history, may be used to gauge the probability of the transaction being approved. In response to the payment processor receiving confirmation that the transaction account details have been verified, the information may be relayed back to the merchant, who will then complete the payment transaction. In response to the verification being denied, the payment processor relays the information to the merchant, who may then decline the transaction.

As used herein, "transmit" may include sending electronic data from one system component to another over a network connection. Additionally, as used herein, "data" may include encompassing information such as commands, queries, files, data for storage, and the like in digital or any other form.

Phrases or terms similar to "transaction account" may include any account that may be used to facilitate a financial transaction. A "transaction account" as used herein refers to an account associated with an open account or a closed account system (as described herein). The transaction account may exist in a physical or non-physical embodiment. For example, a transaction account may be distributed in non-physical embodiments such as an account number, frequent-flyer account, and telephone calling account or the like. Furthermore, a physical embodiment of a transaction account may be distributed as a financial instrument.

Transaction account authorizations may be performed at the transaction account Issuer's Credit Authorization System (CAS) in response to a swipe/submission of transaction instrument data by the transaction account holder at a Point of Sale (PoS) system and/or merchant. The CAS issues an approval code as a proof of authorization. According to various embodiments, the systems and methods disclosed herein allow a transaction account holder, a merchant, a transaction account processing company, and/or any other third party to attach, append, link and/or associate additional details (e.g., documents/receipts/warranty/pictures of the product) or notes, expense tags and/or expense management software categories or reminders (such as for return or any further action on the purchase) to these authorizations. The newly established business process and its technology implementation enables the seamless flow of the attached document/information to the merchant financial transactions (which may be submitted, posted, transaction account issuer processed) in the transaction account statements, such as in an electronic and/or reoccurring statement. Early capture of this information in response to, and almost immediately after the authorization, provides for a seamless flow to the transaction account statement.

In conventional systems, this additional information attachment to the transaction account authorizations (also known as Pending Charges) is not possible today. This enhanced functionality offers convenience (effective expense management, reminders, simplified book keeping) and reduced fraud/disputes of transactions for transaction account holders. This fully automated process solves the tedious, manual intervention driven process of requesting information for multiple parties and matching the document information to the transactions posted after (e.g., 24 hours to 72 hours from) the time of swipe (or presentment of transaction account).

Due to widespread adoption of smart phones and mobile devices, there is an increased need for capturing the details about a transaction in substantially real time and to automatically convert the transaction, along with the captured details, to a posted charge. According to various embodiments, capturing and handling of additional information at the transaction account authorization level is facilitated, which seamlessly flows to the posted, recent activity, and/or billing statement transactions.

Previous solution attempts have been directed to gathering information and keeping the data in a temporary storage at a transaction account holder side, merchant side, transaction account processors side and/or third parties' side. Conventionally, one has to wait for the transaction to be posted by the merchant for the record to be available at the transaction account servicing sites. Historically, once the merchant posts the transactions, either the transaction account holder, transaction account processing company, and/or a third party will initiate a process to match the information captured to the posted transaction. In many cases, the efficiency of this matching is heavily dependent on the optical character recognition, information quality and also manual intervention. Also process efficiency is very low and not reliable in most of the cases. This makes it difficult for transaction account holders to manage their expenses. Automating the enrichment information flow from pending charges/transaction account authorizations to recent activity offers benefits over the existing systems. Allowing enrichment of transaction data based on the authorization, and then carrying that information over in response to the transaction being submitted and posted in the accounts receivable system, may be advantageous to all associated parties.

According to various embodiments, the systems and methods may allow transaction account holders to upload and access electronic receipts associated with a transaction authorization almost immediately after the sale/transaction completion. In this way, more information is available at the transaction level, which helps to provide increased financial clarity. This may result in easier accounting and/or book keeping, Warranty documents and tracking of services may be accommodated by the systems and methods described herein.

According to various embodiments, enhanced satisfaction may be experienced by transaction account holders. For instance, digital connection access is provided to transaction account holders almost immediately after the sale, which can be used for providing continuous support and service. Merchants may be able to provide additional offers to the customers by leveraging the digital connection described herein. The systems and methods described provide for a reduction in disputes and a reduction in fraud as a digital copy for the documents and/or receipts are available all the time at the transaction. Receipt printing and/or POS maintenance cost may be reduced for merchants.

According to various embodiments, transaction account holders may attach additional data to a transaction in response to the authorization, and prior to the merchant posting the transaction, so that the transaction account holder does not have to wait and/or opt for an external service provider to assist with the compiling and/or attaching of data at a later point in time (e.g., after the merchant posts the transaction).

According to various embodiments, a pending transaction is an authorization that has taken place (the transaction is approved by the processor and/or goods have been exchanged for value), where the merchant may decide to post the transaction for reimbursement. For instance, there are many cases the transaction is not actually posted. For example, hotel room reservations may often record a transaction account for the purpose of guaranty of available payment. Typically, at the end of the day, a merchant, for the purpose of being reimbursed, will submit pending charges to an issuing bank and/or transaction account processor to convert the pending charge to a charge. In this way the pending charge is converted to a posted/actual charge.

According to various embodiments and with reference to FIG. 1, a transaction account holder 110 may present the transaction account for payment (step 111) of a transaction, (path 161) at a merchant 120 point of sale system. Where the merchant, via the POS system may transmit a request for authorization (step 121). The Point of sale system sends the request for authorization, (path 162); to the credit authorization system and credit authorization validates the risk and issues the approval authorization code (step 141). The authorization cade may be stored (step 122) by the merchant 120.

According to various embodiments, the approval authorization code is generally issued through third party 130 (path 163) and the approval authorization code may be transmitted to the merchant 120. The authorization code is stored as proof of the transaction and a receipt may be issued (step 122). Path 164 depicts the receipt being received (step 112) by the transaction account holder 110. Path 165 depicts, a call that is sent to alert and notification processor (step 142), which will send out a notification to the transaction account holder 110. The transaction account holder 110 may receive an alert notification (step 113), such as via an email, smart phone notification, or an email and smart phone notification of a recent authorization. Path 167 depicts transaction account holder 110 viewing/accessing pending transaction authorizations which are not yet posted (step 114), such as via a tablet, mobile device and/or desktop.

According to various embodiments, the transaction account holder 110 may upload enrichment data to an authorization, pending charge and/or posted charge (step 115). Thus, the transaction account holder 110 may access (step 114) the online servicing application 143) (step 168). The transaction account holder's 110 financial transaction fetch, (step 148), may retrieve data from account receivable systems (step 149) and or the authorization system (step 141), (via paths 170 and 171). The transaction account holder 110 may now have an authorization and/or a pending transaction. As noted above, the transaction account holder 110 may upload enrichment data (e.g., additional information, documents, tags, notes, reminder needs, warranties, itineraries, reminders, deadlines, product manuals, to an authorization, pending charge and/or posted charge (step 115), In this way, the transaction account holder 110 may attach this information almost immediately after the authorization.

Path 172B depicts the transaction account holder 120 electronically accessing and interacting with a transaction account processing system 140 enrichment data capture interface 144. The enrichment data capture interface 144 may store the data via the data enrichment storage database 150 (path 173A).

Path 172A depicts a path initiated by a merchant 120. The merchant 120 may upload additional information (such as additional information, documents, tags, notes, reminder needs, warranties, itineraries, reminders, deadlines, product manuals, to an authorization, pending charge and/or posted charge (step 123). The Merchant 120 may interact with a transaction account processing system 140 enrichment data capture interface 144. The enrichment data capture interface 144 may store the data via data enrichment storage database 150 (path 173A).

Path 178B depicts a path initiated by a third party 130. The third party 130 may upload additional information (such as additional information, documents, tags, notes, reminder needs, warranties, itineraries, reminders, deadlines, product manuals, to an authorization, pending charge and/or posted charge (step 131). The third party 130 may interact (step 132) with a transaction account processing system 140 enrichment data capture interface 144. A transaction account holder 110 may view the data uploaded by the third party 130. The enrichment data capture interface 144 may store the data via data enrichment storage database 150 (path 178B).

According to various embodiments with continued reference to FIG. 1, an automated process for data transfer (step 151) is accomplished by the transaction account processing system 140 (path 176). In this way, data stored to pending transactions is transferred over to posted, via path 177, transactions (step 152). The enrichment data view interface 146 may interface via paths 179A or 179B the posted charge for enriched data and/or the pending charge for enriched data.

In response to the authorization code and charge details being posted (step 124) by the merchant via path 174 to submission (step 145); the account receivable system 149 received the information. In response to the data reaching account receivable system 149, an automated process for data transfer (step 151, and further illustrated in FIG. 2, may be invoked from pending transactions to posted transactions. For instance, in response to the submission (step 145) data reaching the account receivable system 149, automated data transfer (step 151) may occur. In response to the data being moved to posted charge data enrichment storage 152, the enriched data is available and linked to posted transactions.

Thus, the transaction account holder 110 may view (step 116) the enriched data via the enrichment data view interface (step 146) prior to its posting (path 178A). Reminders, having access (path 181) to posted charge data enrichment storage 152 may be configured to be dispatched (step 147) to be received (step 117) by a transaction account holder 110 via path 180.

Figure 2:
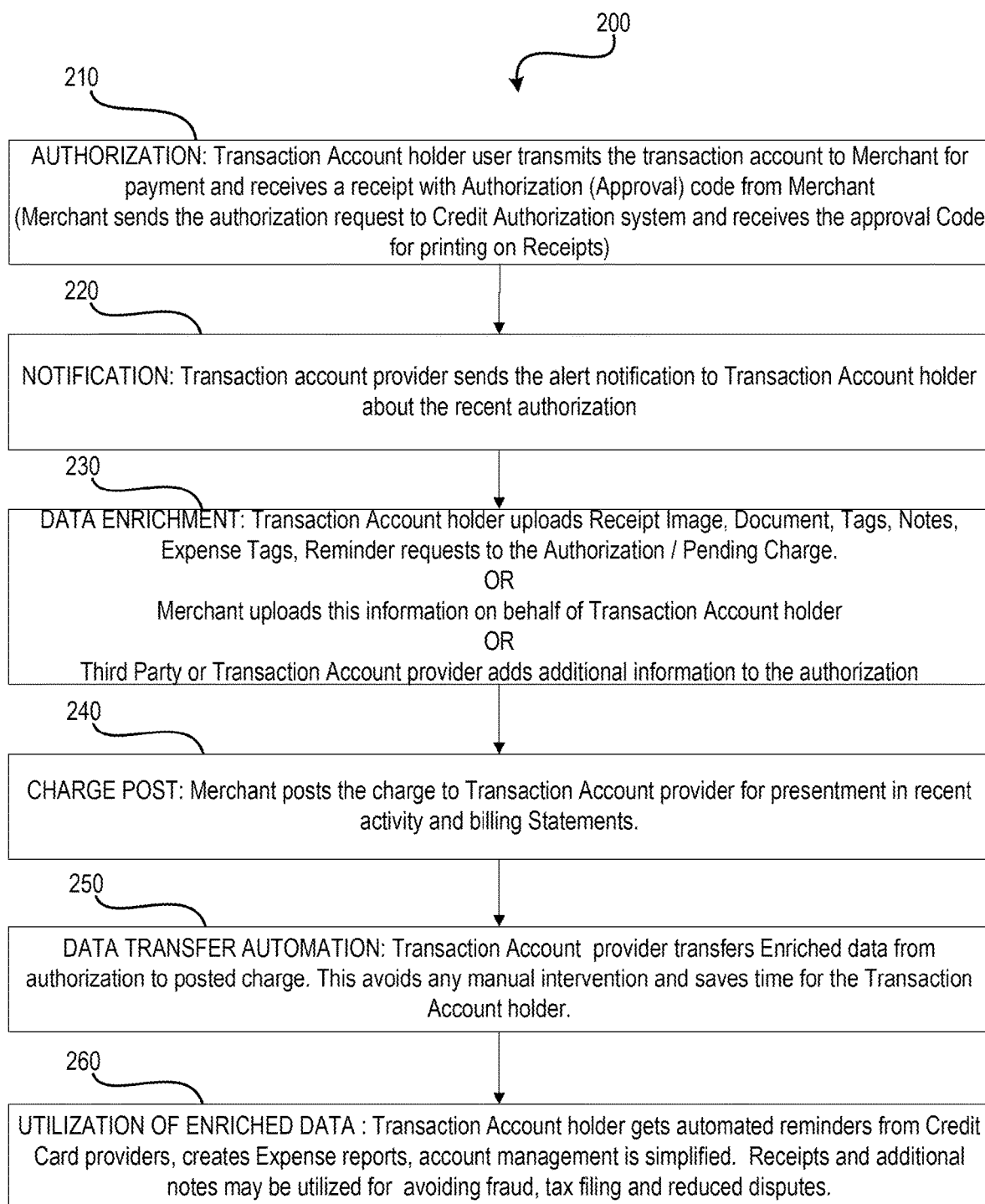
FIG. 2 illustrates a process flow for utilization of enriched data in accordance with various embodiments.

According to various embodiments with reference to FIG. 2 a multi-step process is illustrated. These steps may include authorization, notification, data enrichment, charge posting, data transfer automation, and/or utilization of enriched data. For instance, the authorization may comprise a transaction account holder presenting the transaction account to a Merchant for payment and receives a receipt with Authorization (Approval) code from the Merchant (step 210). The Merchant may transmit the authorization request to a Credit Authorization system and receive the approval Code for printing on Receipts. Notification may comprise a transaction account issuer/provider sending an alert notification to a transaction account holder about the recent authorization (step 220). Data enrichment may comprise a transaction account holder uploading enrichment data, such as a receipt image, documents, tags, notes, expense tags, and/or reminder requests to the authorization and/or pending charge. The merchant may uploads this or other information on behalf of a transaction account holder. A third party or a transaction account provider may add additional information to the authorization (step 230). Charge post may comprise a merchant posting the charge to a transaction account provider for presentment in recent activity and billing statements (step 240). Data transfer automation may comprise a transaction account provider transferring enriched data from authorization to a posted charge (step 250). This may avoid manual intervention and saves time for a transaction account holder. Utilization of the enriched data may comprise a credit card user getting automated reminders from a transaction account providers, creating Expense reports, and/or account management is simplified. Receipts and additional notes may be utilized for avoiding fraud, tax filing and reduced disputes (Step 260).

Figure 3:
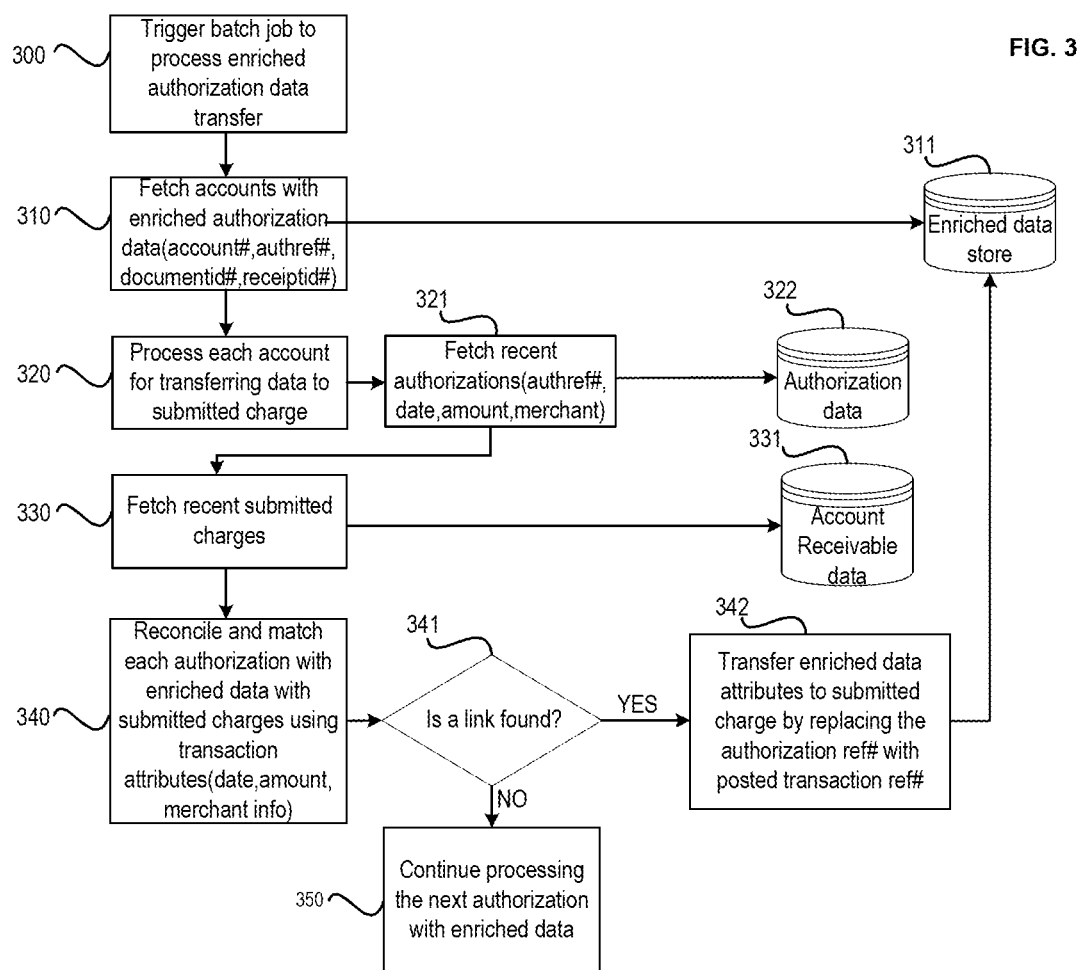
FIG. 3 illustrates a process flow for reconciling enriched data attached to pending transactions to posted transactions, in accordance with various embodiments.

According to various embodiments with reference to FIG. 3 an automated process for data transfer is illustrated. Stated another way, the seamless transferring of enriched data from a pending charge to a posted charge is depicted. A batch job may be triggered to process enriched authorization data transfer on a periodic basis, such as daily or twice daily (step 300). Programming initiates the accounts with enriched authorization data being fetched (step 310) from an enriched data database 311. Stated another way, in response to the transaction account holder uploads receipts and access tags and other details, the data may be stored to a pending charge (step 320). The system may search for recent authorizations on each account (step 321) such as from an authorization data database, 322. Next the system inspects each transaction account for records of submitted charges (step 330) such as via an account receivable database 331. Data consolation occurs in step 340. For instance, the authorization data that is fetched is reconciled with the data that is posted, such as using transaction attributes, such as a transaction date, amount, merchant information, and/or the authorization code. If an association and/or link is found (step 341), the data that is captured at an authorization level is transferred into the corresponding posted charge (step 342). If an association and/or link is not found (step 350), the system continues to search for associations.

According to various embodiments, if enriched data is attached to a pending charge that does not mature into a posted charge, the enriched data may be detached from the pending charge, such as after a predetermined period (7 days) and the transaction account holder may access the enriched data by viewing an unmatched data file. For instance, in a scenario where a hotel holds a reservation with a transaction account, a user may upload their itinerary as enriched data for reimbursement by their employer. Should the transaction account holder later switch transaction accounts from the initial transaction account the reservation was held under to a different account to pay for the reservation, the initial pending charge will not mature into a posted charge. The transaction account holder may view and/or access the enriched data in an unmatched documents section of a transaction account holder user interface.

In general, transaction accounts may be used for transactions between the user and merchant through any suitable communication means, such as, for example, a telephone network, intranet, the global, public Internet, a point of interaction device (e.g., a point of sale (POS) device, personal digital assistant (PDA), mobile telephone, kiosk, etc.), online communications, off-line communications, wireless communications, and/or the like.

An "account", "account code", or "account number", as used herein, may include any device, code, number, letter, symbol, digital certificate, smart chip, digital signal, analog signal, biometric or other identifier/indicia suitably configured to allow the consumer to access, interact with or communicate with the system (e.g., one or more of an authorization/access code, personal identification number (PIN), Internet code, other identification code, and/or the like). The account number may optionally be located on or associated with a rewards card, charge card, credit card, debit card, prepaid card, telephone card, embossed card, smart card, magnetic stripe card, bar code card, transponder, radio frequency card or an associated account. The system may include or interface with any of the foregoing cards or devices, QR codes, Bluetooth, Near Field Communication, or a transponder and RFID reader in RF communication with the transponder (which may include a fob). Typical devices may include, for example, a key ring, tag, card, cell phone, wristwatch or any such form capable of being presented for interrogation.

Moreover, the system, computing unit or device discussed herein may include a "pervasive computing device," which may include a traditionally non-computerized device that is embedded with a computing unit. Examples can include watches, Internet enabled kitchen appliances, restaurant tables embedded with RF readers, wallets or purses with imbedded transponders, etc.

The account code may be distributed and stored in any form of plastic, electronic, magnetic, radio frequency, wireless, audio and/or optical device capable of transmitting or downloading data from itself to a second device. A customer account code may be, for example, a sixteen-digit transaction account code, although each transaction account provider has its own numbering system, such as the fifteen-digit numbering system used by American Express. Each company's transaction account codes comply with that company's standardized format such that the company using a fifteen-digit format will generally use three-spaced sets of numbers, as represented by the number "0000 000000 00000". The first five to seven digits are reserved for processing purposes and identify the issuing bank, card type, etc. In this example, the last (fifteenth) digit is used as a sum check for the fifteen digit number. The intermediary eight-to-eleven digits are used to uniquely identify the customer. A merchant account code may be, for example, any number or alpha-numeric characters that identify a merchant for purposes of card acceptance, account reconciliation, reporting, or the like.

It should be noted that the transfer of information in accordance with the present disclosure, may be completed in a format recognizable by a merchant system or account issuer. In that regard, by way of example, the information may be transmitted from a contactless (e.g., an RFID device) to a contactless (e.g., RFID) reader or from the contactless reader to the merchant system in a variety of formats, e.g., magnetic stripe or multi-track magnetic stripe format.

As used herein, an http session may comprise an impermanent interactive communication exchange between a first web-client (as described herein) and a second web-client and/or between a front-end system, such as a web-client (e.g., a mobile device or personal computer) and a backend system (e.g., a transaction account issuer server or server system).

A web-client may include any device (e.g., personal computing device/mobile communication device) which communicates via any network. A web-client may be associated with and/or used by a consumer, a merchant, or both. A web-client may comprise a variety of browsing software or browser applications (e.g., Microsoft Internet Explorer, Mozilla Firefox, Google Chrome, Apple Safari, or any other of the myriad software packages available for browsing the internet). Such browser applications may comprise Internet browsing software installed within a computing unit or a system to conduct online transactions and/or communications. These computing units or systems may take the form of a computer or processor, or a set of computers/processors, although other types of computing units or systems may be used, including laptops, notebooks, hand held computers, personal digital assistants, cellular phones, smart phones (e.g., iPhonet), BlackBenyt), Droid®), etc.) set-top boxes, workstations, computer-servers, main frame computers, mini-computers, PC servers, pervasive computers, network sets of computers, personal computers, such as iPads, IMACs, and MacBooks, kiosks, terminals, point of sale (POS) devices and/or terminals, televisions, or any other device capable of receiving data over a network.

As those skilled in the art will appreciate, a web-client may include an operating system. (e.g., Windows NT, 95/98/2000/CE/Mobile, OS2, UNIX, Linux, Solaris, MacOS, PalmOS, etc.) as well as various conventional support software and drivers typically associated with computers. A web-client may implement security protocols such as Secure Sockets Layer (SSL) and Transport Layer Security (TLS). A web-client may implement one or more application layer protocols, including, for example, http, https, ftp, and sftp. Transactions originating at a web client may pass through a firewall (not shown; see below) in order to prevent unauthorized access from users of other networks.

A network may comprise any electronic communications system or method which incorporates software and/or hardware components. Communication may be accomplished through any suitable communication channels, such as, for example, a telephone network, an extranet, an intranet, Internet, point of interaction device (point of sale device, personal digital assistant, smart phone, cellular phone (e.g., iPhone), Palm Pilot®), Blackberry®), kiosk, etc.), online communications, satellite communications, off-line communications, wireless communications, transponder communications, local area network (LAN), wide area network (WAN), virtual private network (VPN), networked or linked devices, keyboard, mouse and/or any suitable communication or data input modality. Moreover, although a network may be described herein as being implemented with TCP/IP communications protocols, the network may also be implemented using IPX, Appletalk, IP-6, NetBIOS, OSI, any tunneling protocol (e.g. IPsec, SSH), or any number of existing or future protocols. If the network is in the nature of a public network, such as the Internet, it may be advantageous to presome the network to be insecure and open to eavesdroppers. Specific information related to the protocols, standards, and application software utilized in connection with the Internet is generally known to those skilled in the art and, as such, need not be detailed herein. See, for example, DILIP NAIK, INTERNET STANDARDS AND PROTOCOLS (1998); JAVA 2 COMPLETE, various authors, (Sybex 1999): DEBORAH RAY AND ERIC RAY, MASTERING HTML 4.0 (1997); and LOSHIN, TCP/IP CLEARLY EXPLAINED (1997) and DAVID GOURLEY AND BRIAN TOTTY, HTTP, THE DEFINITIVE GUIDE (2002), the contents of which are hereby incorporated by reference.

The various system components described herein may be independently, separately or collectively coupled to the network via one or more data links including, for example, a connection to an Internet Service Provider (ISP) over a local loop as is typically used in connection with standard modem communication, cable modem, Dish networks, ISDN, Digital Subscriber Line (DSL), or various wireless communication methods, see. e.g., GILBERT HELD, UNDERSTANDING DATA COMMUNICATIONS (1996), which is hereby incorporated by reference. It is noted that the network may be implemented variously. For example, network may be implemented as an interactive television (ITV) network. The systems and methods disclosed herein contemplate the use, sale and/or distribution of any goods, services or information over any network having functionality similar to that described above with reference to network.

In the detailed description herein, references to "one embodiment", "an embodiment", "an example embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in certain embodiments.

In various embodiments, the methods described herein are implemented using the various particular machines described herein. The methods described herein may be implemented using the particular machines, and those hereinafter developed, in any suitable combination, as would be appreciated immediately by one skilled in the art. Further, as is unambiguous from this disclosure, the methods described herein may result in various transformations of certain articles.

For the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor;

and a plurality of databases. Various databases used herein may include: client data; merchant data: financial institution data; and/or like data useful in the operation of the system. As those skilled in the art will appreciate, user computer may include an operating system (e.g., Windows NT, 95/98/ 2000, XP. Vista, OS2, UNIX, Linux, Solaris, MacOS, etc.) as well as various conventional support software and drivers typically associated with computers. A user may include any individual, business, entity, government organization, software and/or hardware that interact with a system.

In an embodiment, various components, modules, and/or engines of system 100 may be implemented as micro-applications or micro-apps. Micro-apps are typically deployed in the context of a mobile operating system, including for example, a Palm mobile operating system, a Windows mobile operating system, an Android Operating System, Apple IOS, a Blackberry operating system and the like. The micro-app may be configured to leverage the resources of the larger operating system and associated hardware via a set of predetermined rules which govern the operations of various operating systems and hardware resources. For example, where a micro-app desires to communicate with a device or network other than the mobile device or mobile operating system, the micro-app may leverage the communication protocol of the operating system and associated device hardware under the predetermined rules of the mobile operating system. Moreover, where the micro-app desires an input from a user, the micro-app may be configured to request a response from the operating system which monitors various hardware components and then communicates a detected input from the hardware to the micro-app.

The system contemplates uses in association with web services, utility computing, pervasive and individualized computing, security and identity solutions, autonomic computing, cloud computing, commodity computing, mobility and wireless solutions, open source, biometrics, grid computing and/or mesh computing.

One skilled in the art will also appreciate that, for security reasons, any databases, systems, devices, servers or other components of the system may consist of any combination thereof at a single location or at multiple locations, wherein each database or system includes any of various suitable security features, such as firewalls, access codes, encryption, decryption, compression, decompression, and/or the like.

Encryption may be performed by way of any of the techniques now available in the art or which may become available—e.g., Twofish, RSA, El Gamal, Schorr signature, DSA, PGP, PKI, and symmetric and asymmetric cryptosystems.

The computers discussed herein may provide a suitable website or other Internet-based graphical user interface which is accessible by users. In one embodiment, the Microsoft Internet Information Server (IIS), Microsoft Transaction Server (MTS), and Microsoft SQL Server, are used in conjunction with the Microsoft operating system, Microsoft NT web server software, a Microsoft SQL Server database system, and a Microsoft Commerce Server. Additionally, components such as Access or Microsoft SQL Server, Oracle, Sybase, Informix MySQL, Interbase, etc., may be used to provide an Active Data Object (ADO) compliant database management system. In one embodiment, the Apache web server is used in conjunction with a Linux operating system, a MySQL database, and the Perl, PHP, and/or Python programming languages.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, Java applets, JavaScript, active server pages (ASP), common gateway interface scripts (CGI), extensible markup language (XML), dynamic HTML, cascading style sheets (CSS), AJAX (Asynchronous Javascript And XML), helper applications, plug-ins, and the like. A server may include a web service that receives a request from a web server, the request including a URL (http://yahoo.com/stockquotes/ge) and an IP address (123.56.789.234). The web server retrieves the appropriate web pages and sends the data or applications for the web pages to the IP address. Web services are applications that are capable of interacting with other applications over a communications means, such as the internet. Web services are typically based on standards or protocols such as XML, SOAP, AJAX, WSDL and UDDI. Web services methods are well known in the art, and are covered in many standard texts. See, e.g., ALEX NGHIEM, IT WEB SERVICES: A ROADMAP FOR THE ENTERPRISE (2003), hereby incorporated by reference.

Middleware may include any hardware and/or software suitably configured to facilitate communications and/or process transactions between disparate computing systems. Middleware components are commercially available and known in the art. Middleware may be implemented through commercially available hardware and/or software, through custom hardware and/or software components, or through a combination thereof. Middleware may reside in a variety of configurations and may exist as a standalone system or may be a software component residing on the Internet server. Middleware may be configured to process transactions between the various components of an application server and any number of internal or external systems for any of the purposes disclosed herein. WebSphere MQTM (formerly MQSeries) by IBM, Inc. (Armonk, NY) is an example of a commercially available middleware product. An Enterprise Service Bus ("ESB") application is another example of middleware.

Practitioners will also appreciate that there are a number of methods for displaying data within a browser-based document. Data may be represented as standard text or within a fixed list, scrollable list, drop-down list, editable text field, fixed text field, pop-up window, and the like. Likewise, there are a number of methods available for modifying data in a web page such as, for example, free text entry using a keyboard, selection of menu items, check boxes, option boxes, and the like.

The system and method may be described herein in terms of functional block components, screen shots, optional selections and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C#, Java, JavaScript, VBScript, Macromedia Cold Fusion, COBOL, Microsoft Active Server Pages, assembly, PERL, PHP, awk, Python, Visual Basic, SQL Stored Procedures, PL/SQL, any UNIX shell script, and extensible markup language (XML)

with the various algorithms being implemented with any combination of data structures, objects, processes, routines or other programming elements. Further, it should be noted that the system may employ any number of conventional techniques for data transmission, signaling, data processing, network control, and the like. Still further, the system could be used to detect or prevent security issues with a client-side scripting language, such as JavaScript, VBScript or the like. For a basic introduction of cryptography and network security, see any of the following references: (1) "Applied Cryptography: Protocols, Algorithms, And Source Code In C," by Bruce Schneier, published by John Wiley & Sons (second edition, 1995); (2) "Java Cryptography" by Jonathan Knudson, published by O'Reilly & Associates (1998); (3) "Cryptography & Network Security: Principles & Practice" by William Stallings, published by Prentice Hall; all of which are hereby incorporated by reference.

As used herein, the term "end user", "consumer", "customer", "cardmember", "business" or "merchant" may be used interchangeably with each other, and each shall mean any person, entity, machine, hardware, software or business. A bank may be part of the system, but the bank may represent other types of card issuing institutions, such as credit card companies, card sponsoring companies, or third party issuers under contract with financial institutions. It is further noted that other participants may be involved in some phases of the transaction, such as an intermediary settlement institution, but these participants are not shown.

Each participant is equipped with a computing device in order to interact with the system, and facilitate online commerce transactions. The customer has a computing unit in the form of a personal computer, although other types of computing units may be used including laptops, notebooks, hand held computers, set-top boxes, cellular telephones, touch-tone telephones and the like. The merchant has a computing unit implemented in the form of a computer-server, although other implementations are contemplated by the system. The bank has a computing center shown as a main frame computer. However, the bank computing center may be implemented in other forms, such as a mini-computer, a PC server, a network of computers located in the same of different geographic locations, or the like. Moreover, the system contemplates the use, sale or distribution of any goods, services or information over any network having similar functionality described herein.

The merchant computer and the bank computer may be interconnected via a second network, referred to as a payment network. The payment network which may be part of certain transactions represents existing proprietary networks that presently accommodate transactions for credit cards, debit cards, and other types of financial/banking cards. The payment network is a closed network that is assumed to be secure from eavesdroppers. Exemplary transaction networks may include the American Express®, VisaNet® and the Veriphone® networks.

The electronic commerce system may be implemented at the customer and issuing bank. In an exemplary implementation, the electronic commerce system is implemented as computer software modules loaded onto the customer computer and the banking computing center. The merchant computer does not require any additional software to participate in the online commerce transactions supported by the online commerce system.

As will be appreciated by one of ordinary skill in the art, the system may be embodied as a customization of an existing system, an add-on product, upgraded software, a stand alone system, a distributed system, a method, a data processing system, a device for data processing, and/or a computer program product. Accordingly, the system may take the form of an entirely software embodiment, an entirely hardware embodiment, or an embodiment combining aspects of both software and hardware. Furthermore, the system may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

The system and method is described herein with reference to screen shots, block diagrams and flowchart illustrations of methods, apparatus (e.g., systems), and computer program products according to various embodiments. It will be understood that each functional block of the block diagrams and the flowchart illustrations, and combinations of functional blocks in the block diagrams and flowchart illustrations, respectively, can be implemented by computer program instructions.

These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user windows, webpages, websites, web forms, prompts, etc. Practitioners will appreciate that the illustrated steps described herein may comprise in any number of configurations including the use of windows, webpages, web forms, popup windows, prompts and the like. It should be further appreciated that the multiple steps as illustrated and described may be combined into single webpages and/or windows but have been expanded for the sake of simplicity. In other cases, steps illustrated and described as single process steps may be separated into multiple webpages and/or windows but have been combined for simplicity.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to 'at least one of A, B, and C' or 'at least one of A, B, or C' is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B. A and C, B and C, or A and B and C. Although the inventions have been described as a method in certain embodiments, it is contemplated that it may be embodied as computer program instructions on a tangible computer-readable carrier, such as a magnetic or optical memory or a magnetic or optical disk. All structural, chemical, and functional equivalents to the elements of the above-described exemplary embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112 (f) unless the element is expressly recited using the phrase "means for" As used herein, the terms "comprises", "comprising", or any other variation thereof are intended to cover a non-exclusive inclusion, such that a process, method article, or apparatus that comprises's list of elements does not include only those elements but may include other elements not expressly listed or inherent to such process, method, article, or apparatus.

Therefore, the following is claimed:

1. A method, comprising:
   accessing, by a client device, a list of pending charges from a remote computing device, wherein the list of pending charges includes a pending charge of a transaction before the transaction is listed on a record of posted charges, and wherein the list of pending charges is associated with and corresponds to a transaction account of a user;
   displaying the list of pending charges via a display of the client device of the user;
   based on an authorization of the transaction, uploading enriched data associated with the pending charge by the user via a user interface of the client device to the remote computing device, wherein the uploading occurs before the transaction is listed on the record of posted charges, and wherein the enriched data is stored in an authorization data enrichment storage database of the remote computing device;
   viewing by the client device at least one of the enriched data stored in the authorization data enrichment storage database or the enriched data stored in a posted charge data enrichment database of the remote computing device, wherein the enriched data stored in the posted charge data enrichment database is linked to corresponding posted transactions in response to the enriched data being moved from the authorization data enrichment storage database to the posted charge data enrichment database; and
   receiving by the client device at least one of a reminder, an expense report, or account management information from the remote computing device, wherein the at least one of the reminder, the expense report, or the account management information is generated by the remote computing device using the enriched data.

2. The method of claim 1, wherein the enriched data comprises at least one of:
   text, an image, a file, an expense tag, a document, or a note.

3. The method of claim 1, wherein the enriched data is attached to a posted charge for the transaction after the enriched data is uploaded.

4. The method of claim 1, further comprising:
   sending, by the client device, a dispute notification for a send pending charge associated with a second transaction to the remote computing device.

5. The method of claim 1, wherein the pending charge comprises:
   an authorization code for transferring the enriched data from the pending charge to a posted charge of the transaction.

6. The method of claim 1, further comprising:
   receiving, by the client device, a notification of the pending charge in response to the authorization of the transaction.

7. A system, comprising:
   a client device comprising a processor, a memory, and a display; and
   the memory storing machine-readable instructions that, when executed by the processor, cause the client device to:
      access a list of pending charges from a remote computing device, wherein the list of pending charges includes a pending charge of a transaction before the transaction is listed on a record of posted charges, and wherein the transaction is associated with and corresponds to a transaction account of a user;
      display the list of pending charges via the display of the client device of the user;
      based on an authorization of the transaction, upload enriched data associated with the pending charge by the user via a user interface of the client device to the remote computing device, wherein the upload occurs before the transaction is listed on the record of posted charges, and wherein the enriched data is stored in an authorization data enrichment storage database of the remote computing device;
      view at least one of the enriched data stored in the authorization data enrichment storage database or the enriched data stored in a posted charge data enrichment database of the remote computing device, wherein the enriched data stored in the posted charge data enrichment database is linked to corresponding posted transactions in response to the enriched data being moved from the authorization data enrichment storage database to the posted charge data enrichment database; and
      receive at least one of a reminder, an expense report, or account management information from the remote computing device, wherein the at least one of the reminder, the expense report, or the account management information is generated by the remote computing device using the enriched data.

8. The system of claim 7, wherein the enriched data comprises at least one of:
text, an image, a file, an expense tag, a document, or a note.

9. The system of claim 7, wherein the enriched data is attached to a posted charge for the transaction after the enriched data is uploaded.

10. The system of claim 7, wherein the machine-readable instructions, when executed by the processor, cause the client device to:
send a dispute notification for a second pending charge associated with a second transaction to the remote computing device.

11. The system of claim 7, wherein the pending charge comprises:
an authorization code for transferring the enriched data from the pending charge to a posted charge of the transaction.

12. The system of claim 7, wherein the user interface displays the list of pending charges in response to receiving a viewing request to view the list of pending charges.

13. A non-transitory computer-readable medium comprising machine-readable instructions that, when executed by a processor, cause a client device to:
access a list of pending charges from a remote computing device, wherein the list of pending charges includes a pending charge of a transaction before the transaction is listed on a record of posted charges, and wherein the transaction is associated with and corresponds to a transaction account of a user;
display the list of pending charges via the display of the client device of the user;
based on an authorization of the transaction, upload enriched data associated with the pending charge by the user via a user interface of the client device to the remote computing device, wherein the upload occurs before the transaction is listed on the record of posted charges, and wherein the enriched data is stored in an authorization data enrichment storage database of the remote computing device;
view by the client device at least one of the enriched data stored in the authorization data enrichment storage database or the enriched data stored in a posted charge data enrichment database of the remote computing device, wherein the enriched data stored in the posted charge data enrichment database is linked to corresponding posted transactions in response to the enriched data being moved from the authorization data enrichment storage database to the posted charge data enrichment database; and
receive at least one of a reminder, an expense report, or account management information from the remote computing device, wherein the at least one of the reminder, the expense report, or the account management information is generated by the remote computing device using the enriched data.

14. The non-transitory computer-readable medium of claim 13, wherein the enriched data comprises at least one of:
text, an image, a file, an expense tag, a document, or a note.

15. The non-transitory computer-readable medium of claim 13, wherein the enriched data is attached to a posted charge for the transaction after the enriched data is uploaded.

16. The non-transitory computer-readable medium of claim 13, the machine-readable instructions, when executed by the processor, cause the client device to at least:
send a dispute notification for a second pending charge associated with a second transaction to the remote computing device.

17. The non-transitory computer-readable medium of claim 13, wherein the pending charge comprises:
an authorization code for transferring the enriched data from the pending charge to a posted charge of the transaction.

* * * * *